UNITED STATES PATENT OFFICE.

JOSEPH ROSENHEK AND HENRY MIROCOURT, OF LYON, AND ROBERT LOUP, OF CALUIRE, FRANCE, ASSIGNORS TO MANUFACTURE LYONNAISE DE MATIERES COLORANTES, OF LYON, FRANCE.

PROCESS OF MAKING SODIUM HYDROSULFITE.

990,457. Specification of Letters Patent. Patented Apr. 25, 1911.

No Drawing. Application filed April 21, 1910. Serial No. 556,820. (Specimens.)

*To all whom it may concern:*

Be it known that we, JOSEPH ROSENHEK, doctor of philosophy, a subject of the Austro-Hungarian Empire, and a resident of 27 Avenue de Noailles, Lyon, in the Republic of France, HENRY MIROCOURT, a subject of the Republic of France, and a resident of 15 Avenue Berthelot, Lyon, France, and ROBERT LOUP, a Swiss subject, and residing at 8 Chemin de Vassieux, Caluire, Department of the Rhone, France, have invented some new and useful Improvements in the Production of Hydrosulfite Compounds and Processes of Making the Same, of which the following is a specification.

It is known that the rather unstable sodium hydrosulfite containing 2 mol. of water of crystallization, which is obtained for instance by precipitating solutions of hydrosulfite with common salt, may be transformed into a stable form by subsequently removing the water of crystallization by various method.

We have now discovered a new process which allows of producing directly a precipitate of a stable hydrosulfite compound and which consists in the simultaneous action of formaldehyde-sodium sulfoxylate (hyraldite) and sodium bisulfite and common salt at a temperature exceeding 50° C. The hydrosulfite separates immediately in its anhydrous form. The new process is of special practical value by reason of the fact that the mother-liquor may be used again for the manufacture of hyraldite. The reaction is represented by the chemical equation

$$2NaHSO_3 + NaHSO_2.CH_2O = NaHSO_3CH_2O + Na_2S_2O_4 + H_2O.$$

The process is illustrated by the following example: 420 liters bisulfite solution containing 208 kilos $NaHSO_3$, containing no free sulfurous acid, are heated to 60° C., 140 kilos common salt are introduced, and the temperature is raised to about 65° C. In a second vessel a concentrated solution of 118 kilos $OH.CH_2SO_2Na$, brought to about 230 liters by the addition of water, are heated to 65° C. The contents of both vessels are then mixed as rapidly as possible. The temperature increases by about 8° C., and a heavy precipitate of anhydrous hydrosulfite separates. It is filtered off, the mother-liquor removed carefully, and the precipitate dried with the necessary precaution of preventing an oxidation by the oxygen of the air. The substance so obtained is a colorless or slightly pinkish colored powder easily soluble in water. It consists of small crystals of acuminated prismatic shape. It is very voluminous, one liter weighing about 800 grams. An amount of the salt containing one gram of sulfur reduces 4 gr. of indigo.

We claim—

The process of producing a stable hydrosulfite compound by mixing formaldehyde-sodium sulfoxylate, sodium bisulfite and common salt in a concentrated solution at a temperature exceeding 50° C. substantially as described.

In witness whereof we have hereunto signed our names this sixth day of April 1910, in the presence of two subscribing witnesses.

JOSEPH ROSENHEK.
HENRY MIROCOURT.
ROBERT LOUP.

Witnesses:
THOMAS N. BROWNE,
MARIN VACHON.